United States Patent
Ju

(10) Patent No.: US 11,526,705 B2
(45) Date of Patent: Dec. 13, 2022

(54) METHOD OF CLASSIFICATING OUTLIER IN OBJECT RECOGNITION AND DEVICE AND ROBOT OF CLASSIFYING THEREOF

(71) Applicant: LG ELECTRONICS INC., Seoul (KR)

(72) Inventor: Jeongwoo Ju, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 588 days.

(21) Appl. No.: 16/490,068

(22) PCT Filed: Apr. 1, 2019

(86) PCT No.: PCT/KR2019/003807
§ 371 (c)(1),
(2) Date: Aug. 29, 2019

(87) PCT Pub. No.: WO2020/204219
PCT Pub. Date: Oct. 8, 2020

(65) Prior Publication Data
US 2021/0365746 A1    Nov. 25, 2021

(51) Int. Cl.
*G06K 9/62* (2022.01)
*G06N 3/08* (2006.01)

(52) U.S. Cl.
CPC .......... *G06K 9/6269* (2013.01); *G06K 9/628* (2013.01); *G06K 9/6215* (2013.01); *G06K 9/6228* (2013.01); *G06K 9/6259* (2013.01); *G06N 3/08* (2013.01)

(58) Field of Classification Search
USPC .......................  706/15, 12, 20; 382/159, 190
See application file for complete search history.

(56) References Cited

U.S. PATENT DOCUMENTS

| 8,527,432 B1 * | 9/2013 | Guo ....................... G06N 20/10 706/14 |
| 11,069,082 B1 * | 7/2021 | Ebrahimi Afrouzi ..... G06T 7/70 |
| 2006/0165277 A1 * | 7/2006 | Shan ..................... G06K 9/6293 382/104 |
| 2008/0320014 A1 * | 12/2008 | Chu ..................... G06K 9/6228 |

(Continued)

FOREIGN PATENT DOCUMENTS

| KR | 1020170108339 | 9/2017 |
| KR | 1020180069452 | 6/2018 |

(Continued)

OTHER PUBLICATIONS

Cai et al, "Unsupervised Feature Selection for Multi-Cluster Data" Copyright 2010 ACM 978-1-4503-0055-1/10/07, pp. 333-342. (Year: 2010).*

(Continued)

*Primary Examiner* — Kathleen Y Dulaney
(74) *Attorney, Agent, or Firm* — Lee Hong Degerman Kang & Waimey

(57) ABSTRACT

The present invention relates to a method, device, and robot for classifying an outlier during object recognition learning using artificial intelligence. The method or device for classifying an outlier during object recognition learning according to an embodiment of the present invention sets an inlier region and an outlier region through learning using unlabeled data and labeled data.

11 Claims, 15 Drawing Sheets

(56) References Cited

U.S. PATENT DOCUMENTS

| | | | | |
|---|---|---|---|---|
| 2017/0017899 | A1* | 1/2017 | Maor | G06F 16/285 |
| 2017/0213153 | A1* | 7/2017 | Wang | G06F 16/283 |
| 2018/0174001 | A1* | 6/2018 | Kang | G06K 9/6256 |
| 2018/0354132 | A1* | 12/2018 | Noh | B25J 9/1666 |
| 2019/0087425 | A1 | 3/2019 | Kim et al. | |
| 2019/0095788 | A1* | 3/2019 | Yazdani | G06N 3/0454 |
| 2019/0188212 | A1* | 6/2019 | Miller | G06N 7/005 |
| 2020/0057961 | A1* | 2/2020 | Vahdat | G06N 5/003 |
| 2020/0106678 | A1* | 4/2020 | Grill | H04L 41/142 |
| 2020/0370058 | A1* | 11/2020 | Davis | C12N 15/1079 |
| 2020/0372414 | A1* | 11/2020 | Maor | G06F 16/2456 |
| 2021/0120731 | A1* | 4/2021 | Mota Manhaes | A01B 79/005 |

FOREIGN PATENT DOCUMENTS

| | | |
|---|---|---|
| KR | 1020180134683 | 12/2018 |
| KR | 1020190029083 | 3/2019 |

OTHER PUBLICATIONS

Yang et al, "Semi-Supervised Learning Based on Group Sparse for Relative Attributes" 2015, IEEE, pp. 3931-3935. (Year: 2015).*

Lafferty et al, "Kernel Conditional Random Fields: Representation and Clique Selection" 2004, Proceedings of the 21st International Conference on Machine Learning, pp. 1-8 (Year: 2004).*

Zhuang et al "Representation Learning via Semi-supervised Auto encoder for Multi-task learning", 2015 IEEE International Conference on Data Mining, pp. 1141-1146 (Year: 2015).*

Nakashika et al "Sparse Representation for OU Tliers Suppression in Semi-Supervised Image Annotation" 2013 IEEE pp. 2080-2083 (Year: 2013).*

Li et al, "Unsupervised Feature Selection Using Nonnegative Spectral Analysis" 2012, Proceedings of the Twenty-Sixth AAAI Conference on Artificial Intelligence, pp. 1026-1032 (Year: 2012).*

PCT International Application No. PCT/KR2019/003807, International Search Report dated Dec. 24, 2019, 3 pages.

* cited by examiner

FIG. 12
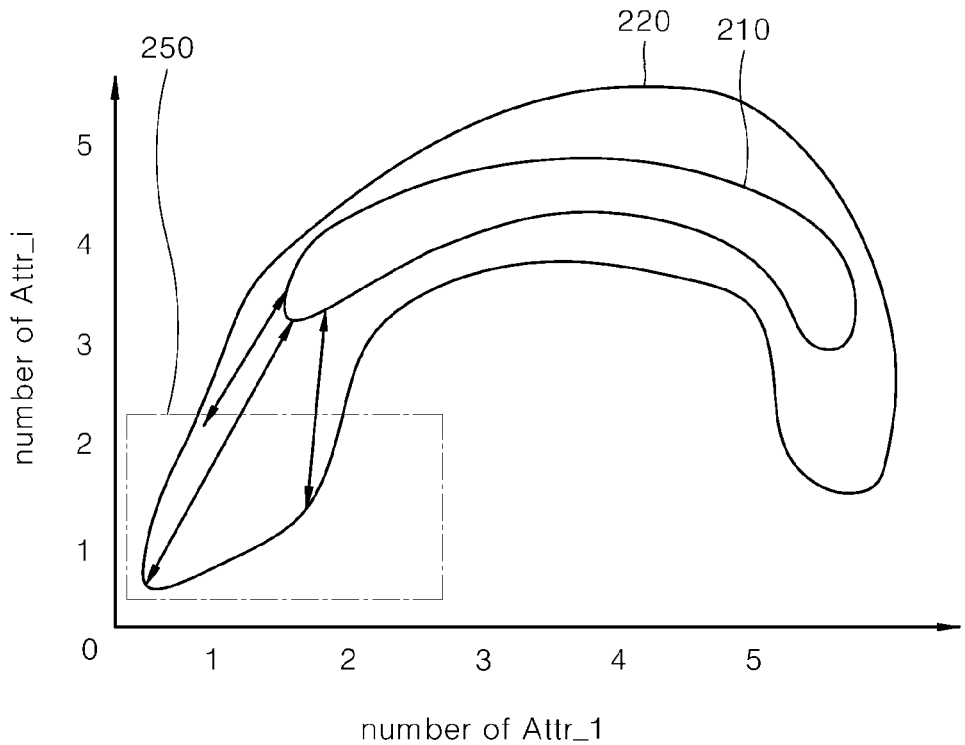
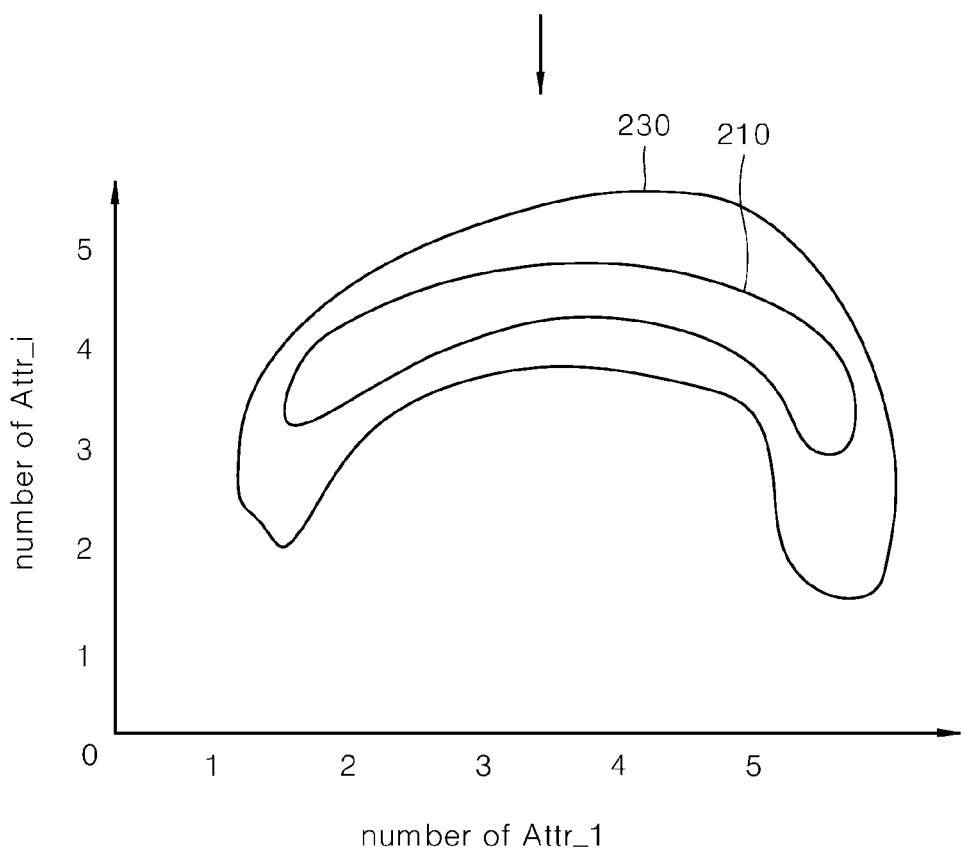

FIG. 13
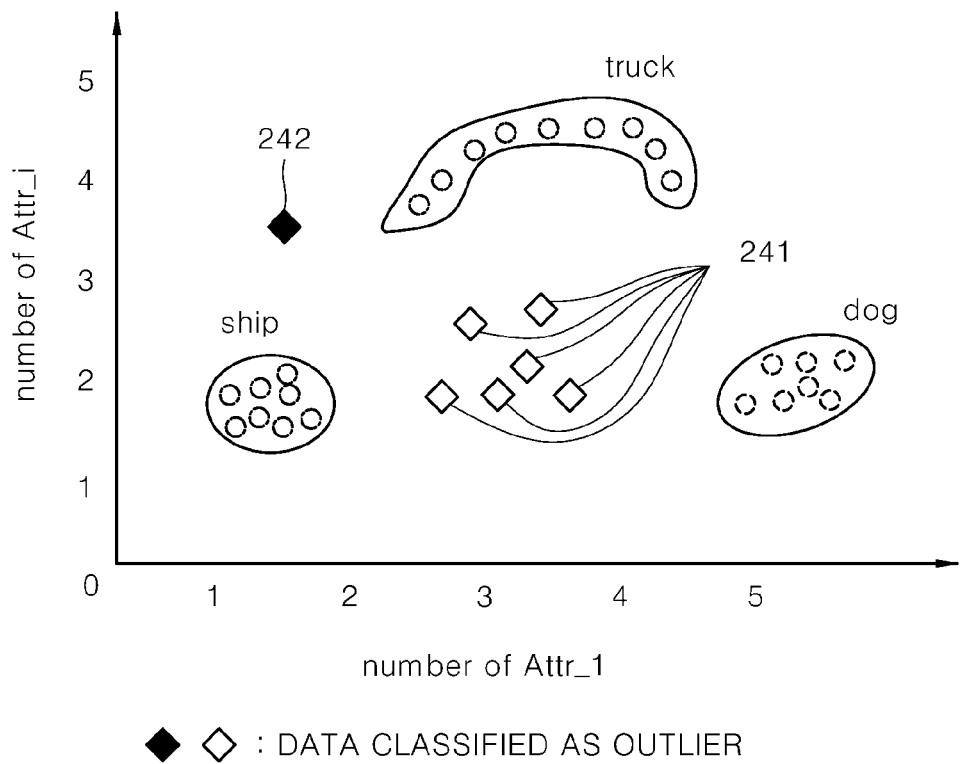
◆ ◇ : DATA CLASSIFIED AS OUTLIER
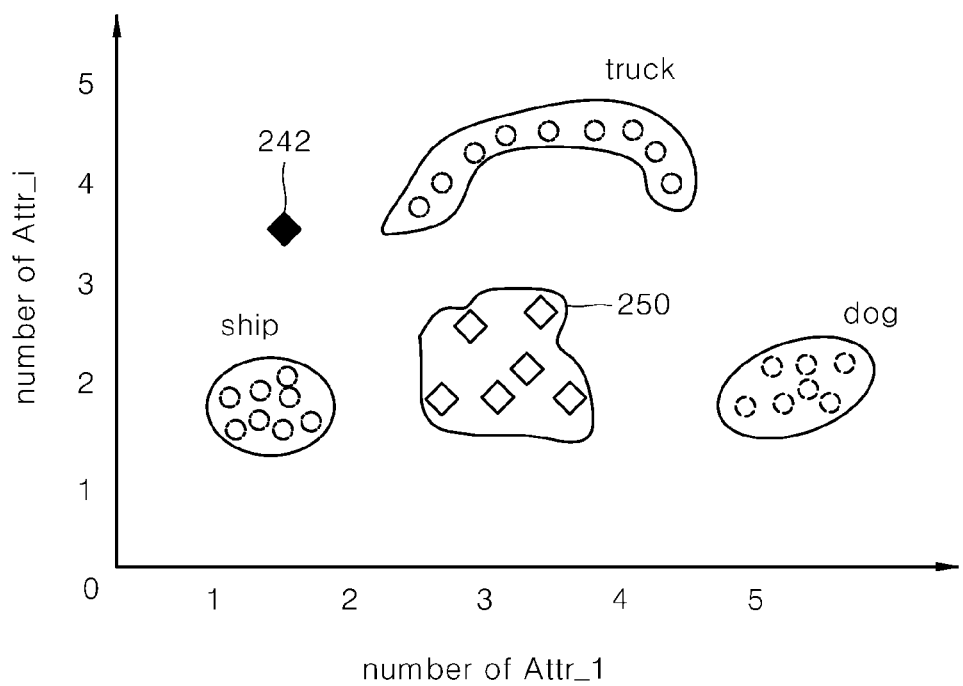

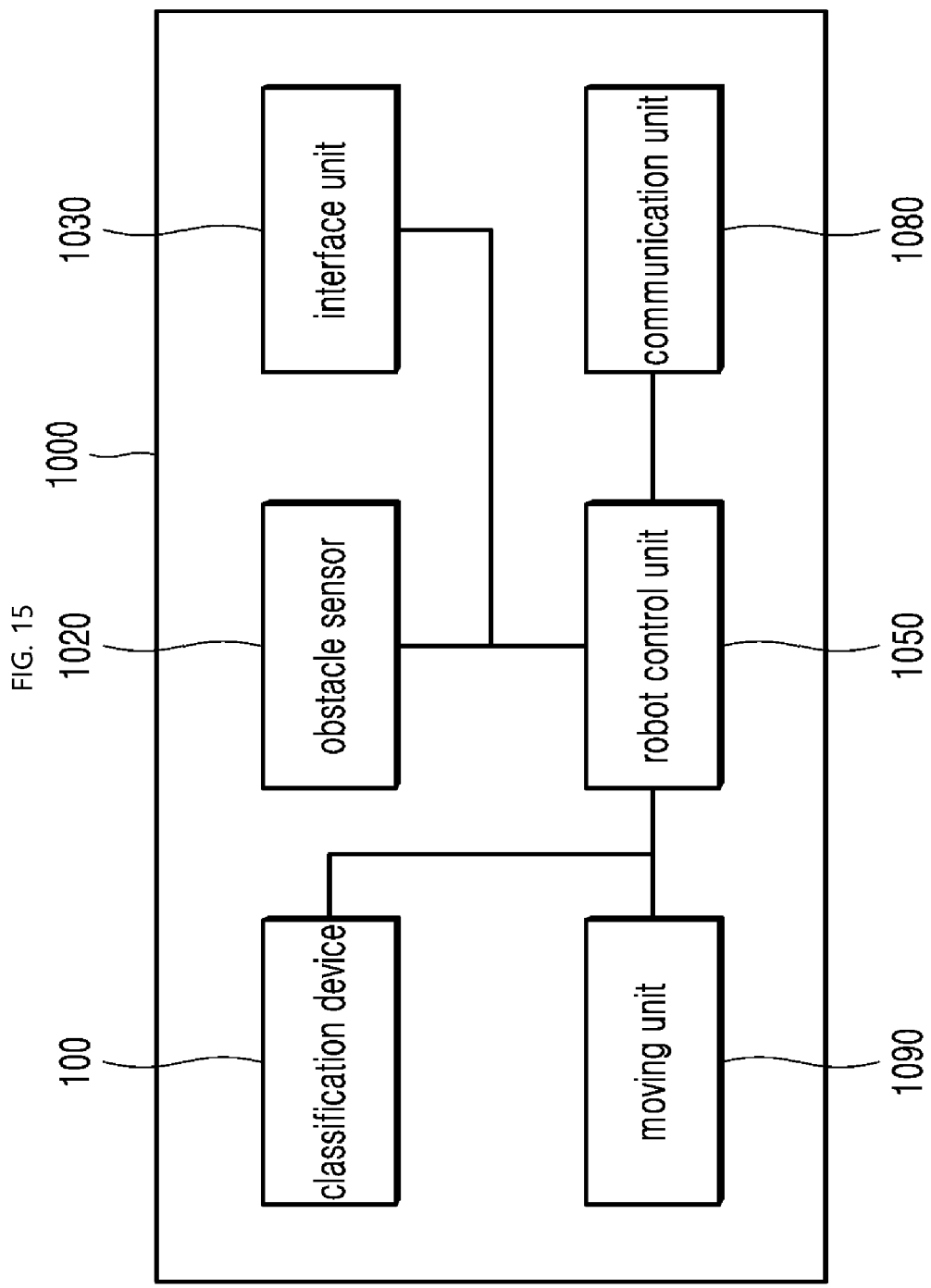

METHOD OF CLASSIFICATING OUTLIER IN OBJECT RECOGNITION AND DEVICE AND ROBOT OF CLASSIFYING THEREOF

CROSS-REFERENCE TO RELATED APPLICATIONS

This application is the National Stage filing under 35 U.S.C. 371 of International Application No. PCT/KR2019/003807, filed on Apr. 1, 2019, the contents of which are all hereby incorporated by reference herein in their entirety.

TECHNICAL FIELD

The present invention relates to a technology for a method, device, and robot for classifying an outlier using artificial intelligence.

BACKGROUND ART

In order to identify and classify an object in a captured image or a stored image, there is a need for a process of learning an image file based on various objects and a process of testing the learned image file.

That is, an object recognition process is learned using test image data of certain parameters. During the learning process, a label for each object may be assigned, or a stored label may be matched.

However, in this process, the label for the object is matched by being applied to an image of a certain range of objects. However, actually, all objects cannot be defined using labels, and thus an error may occur during a classification process for an image group to which no labels are added.

Accordingly, a method of processing an image of a new object that has not been learned to improve accuracy in an object recognition process will be described below.

DISCLOSURE

Technical Problem

The present specification is intended to solve the above-described problems and proposes a solution for processing an image of an unclassified object among unlabeled data learned in an object recognition process and labeled data guiding the learning of the unlabeled data.

The present specification proposes a solution for primarily setting a classification class on the basis of labeled data during an object recognition process and then for processing data corresponding to the outside of the class.

The present specification is intended to solve a problem of data being misclassified by forming a separate outlier region that does not belong to an inlier region calculated from the total recognition result during an object recognition process.

The objects of the present invention are not limited to the aforementioned objects, and other objects and advantages thereof, which are not mentioned above, will be understandable from the following description and can be more clearly understood by the embodiments of the present invention. Also, it will be readily appreciated that the objects and advantages of the present invention can be realized by means and combinations thereof as set forth in the claims.

A method or device for classifying an outlier during object recognition learning according to an embodiment of the present invention performs learning using unlabeled data and labeled data to set an inlier region and an outlier region.

In the method or device for classifying an outlier during object recognition learning according to an embodiment of the present invention, a learning unit of the classification device performs learning on the basis of unlabeled data and selects N attributes using labeled data from K attributes calculated through the learning.

In the method or device for classifying an outlier during object recognition learning according to an embodiment of the present invention, a control unit of the classification device sets an inlier region for each class of the labeled data in an attribute space composed of the N attributes and then sets an outlier region excluding the inlier region in the attribute space.

In the method or device for classifying an outlier during object recognition learning according to an embodiment of the present invention, the learning unit inputs the unlabeled data to a learning network in the learning unit and generates the K attributes, and the learning network is a deep convolutional neural network.

In the method or device for classifying an outlier during object recognition learning according to an embodiment of the present invention, when N attributes necessary to calculate the inlier region are selected, the learning unit selects the N attributes by calculating a degree of internal density of a class and a degree of external separation between classes which are calculated for each of the K attributes and applying a descending order of the degree of density or a descending order of the degree of separation.

In the method or device for classifying an outlier during object recognition learning according to an embodiment of the present invention, the control unit inputs new data to the learning unit, and when the learning unit calculates a result indicating that the input data is not mapped to the inlier region, the control unit sets the new data as outlier data of the outlier region.

In the method or device for classifying an outlier during object recognition learning according to an embodiment of the present invention, the control unit calculates a distance between multiple pieces of outlier data positioned in the outlier region and defines the multiple pieces of outlier data as one class.

Advantageous Effects

According to embodiments of the present invention, it is possible to set an outlier region in addition to an inlier region and map, to the outlier region, an unclassified object among unlabeled data learned during an object recognition process and labeled data guiding the learning of the unlabeled data.

According to embodiments of the present invention, it is possible to primarily set a classification class on the basis of the labeled data during an object recognition process and then map data corresponding to the outside of the class to a new outlier region, instead of classifying the corresponding data into an existing class.

According to embodiments of the present invention, it is possible to solve a problem of data being misclassified by forming an outlier region that does not belong to the previously set inlier region during an object recognition process.

The effects of the present invention are not limited to the aforementioned effects, and those skilled in the art may easily derive various effects of the present invention in the configuration of the present invention.

DESCRIPTION OF DRAWINGS

FIG. 12 shows a process of a control unit setting an inlier region by positioning labeled data and unlabeled data in a selected attribute space according to another embodiment of the present invention.

FIG. 13 shows a process of defining an outlier region as a new inlier region according to an embodiment of the present invention.

FIG. 15 shows an example in which the classification device is implemented 20 in a robot according to an embodiment of the present invention.

DETAILED DESCRIPTION

Figure 1:
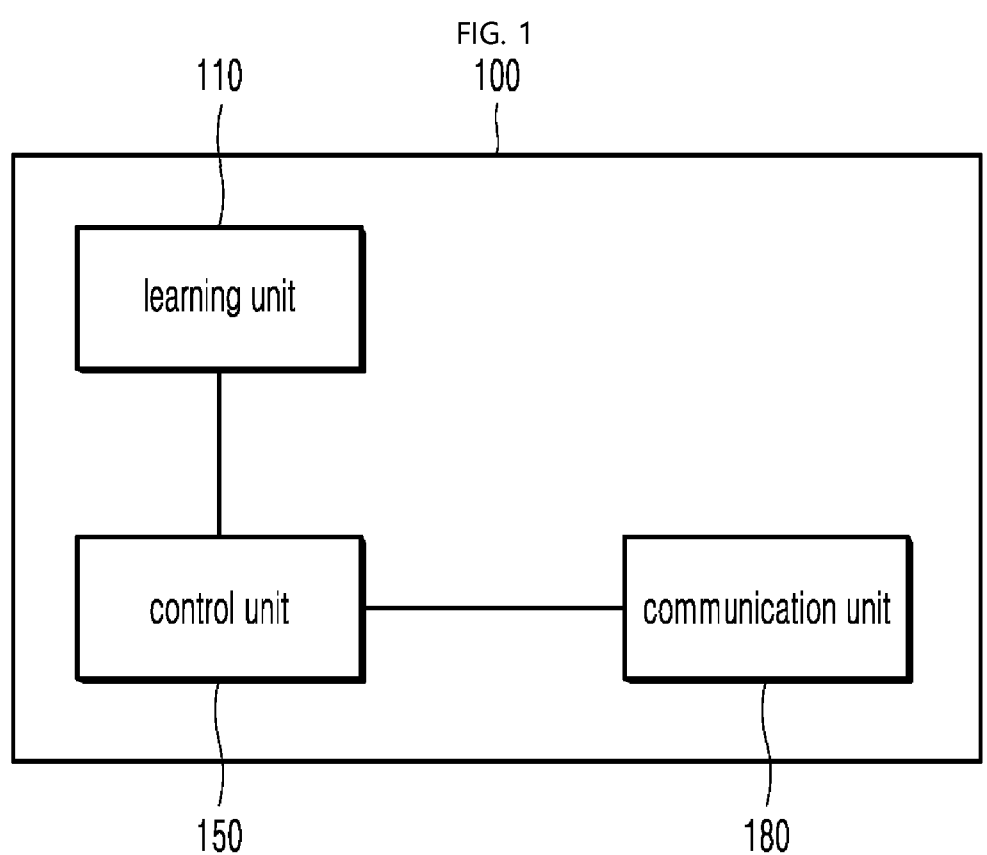
FIG. 1 shows a configuration of a classification device according to an embodiment of the present invention.

Hereinafter, exemplary embodiments of the present invention will be described in detail with reference to the accompanying drawings so that they can be easily practiced by those skilled in the art. The present invention may be embodied in many different forms and should not be construed as being limited to the embodiments set forth herein.

Also, portions irrelevant to the description of the present invention will be omitted for clarity. Moreover, the same or similar elements are designated by the same reference numerals throughout the specification. Also, some embodiments of the present invention will be described in detail with reference to the accompanying drawings. In adding reference numerals to elements in each figure, it should be noted the same elements will be designated by the same reference numerals, if possible, even though they are shown in different drawings. Further, in the following description of the present invention, a detailed description of known functions or configurations incorporated herein will be omitted when it is determined that the description may make the subject matter of the present invention rather unclear.

In addition, terms such as first, second, A, B, (a), (b) and the like may be used herein when describing the elements of the present invention. These terms are intended to distinguish one element from other elements, and the essence, order, sequence, or number of corresponding elements is not limited by these terms. It should be understood that when any one element is described as being "connected," "combined," or "coupled" to another element, they may be connected, combined, or coupled to each other directly or with an intervening element therebetween.

Further, for convenience of description, one element may be described as its sub-elements in implementing the present invention; however, the sub-elements may be implemented in a single device or module in an integrated manner or implemented in multiple devices or modules in a distributed manner.

FIG. 1 shows a configuration of a classification device according to an embodiment of the present invention. The classification device receives, learns, and classifies data having no labels. Here, a label refers to meta-information such as a description of data, category, name, or the like.

Labeled data refers to image data with meta-information for describing a corresponding image. As an embodiment, the labeled data includes vehicle photos labeled with "vehicle" and "truck." Unlabeled data refers to image data without meta-information for describing a corresponding image.

The unlabeled data may be collected in large quantities over the Internet. Alternatively, a large amount of image data may be stored in a storage medium to be appropriate for a learning process for object recognition, and a classification device 100 may apply the unlabeled data stored in the storage medium to perform learning. It will be appreciated that a communication unit 180 may receive a large amount of unlabeled data.

The classification device 100 of FIG. 1 includes multiple software or hardware components. In some embodiments, various elements of FIG. 1 may be implemented by a single software or hardware component. Also, the classification device 100 may be installed in a robot. This will be described in detail with reference to FIG. 15.

For example, a learning unit 110 is in charge of learning. A control unit 150 sets an inlier region in an attribute space. Also, the learning unit 110 and the control unit 150 may be implemented in a single module, and the single module may operate without distinguishing between the learning unit 110 and the control unit 150.

A communication unit 180 receives data from the outside.

The learning unit 110 performs learning for data classification necessary for object recognition using data received from the communication unit 180 or data previously stored. The control unit 150 controls the learning unit 110 and the communication unit 180.

In more detail, the learning unit 110 receives unlabeled data and performs learning to calculate K attributes. Then, the learning unit 110 receives labeled data and selects N (0<N<K) attributes from among the K attributes.

The control unit 150 sets an inlier region for each class of the labeled data in an attribute space composed of the N attributes and then sets an outlier region excluding the inlier region in the attribute space.

The attribute space is an N-dimensional space. The unlabeled data may have values for the N attributes in the learning unit 110. Also, according to the values for the N attributes, each piece of the unlabeled data is positioned in the attribute space.

For example, when there are two attributes, the control unit 150 forms an attribute space in X and Y axes, and the unlabeled data is positioned according to two attribute values of each piece of the unlabeled data. Also, the control unit 150 may add an inlier region and a label for the corresponding region on the basis of a region where the unlabeled data is positioned and a region where the labeled data is positioned.

As a result, the inlier region may correspond to a specific class. It will be appreciated that two or more inlier regions may correspond to one class. The control unit 150 stores information on a class to which one or more inlier regions correspond, recognizes an image of an object, and determines in which class the recognized object is included.

Figure 2:
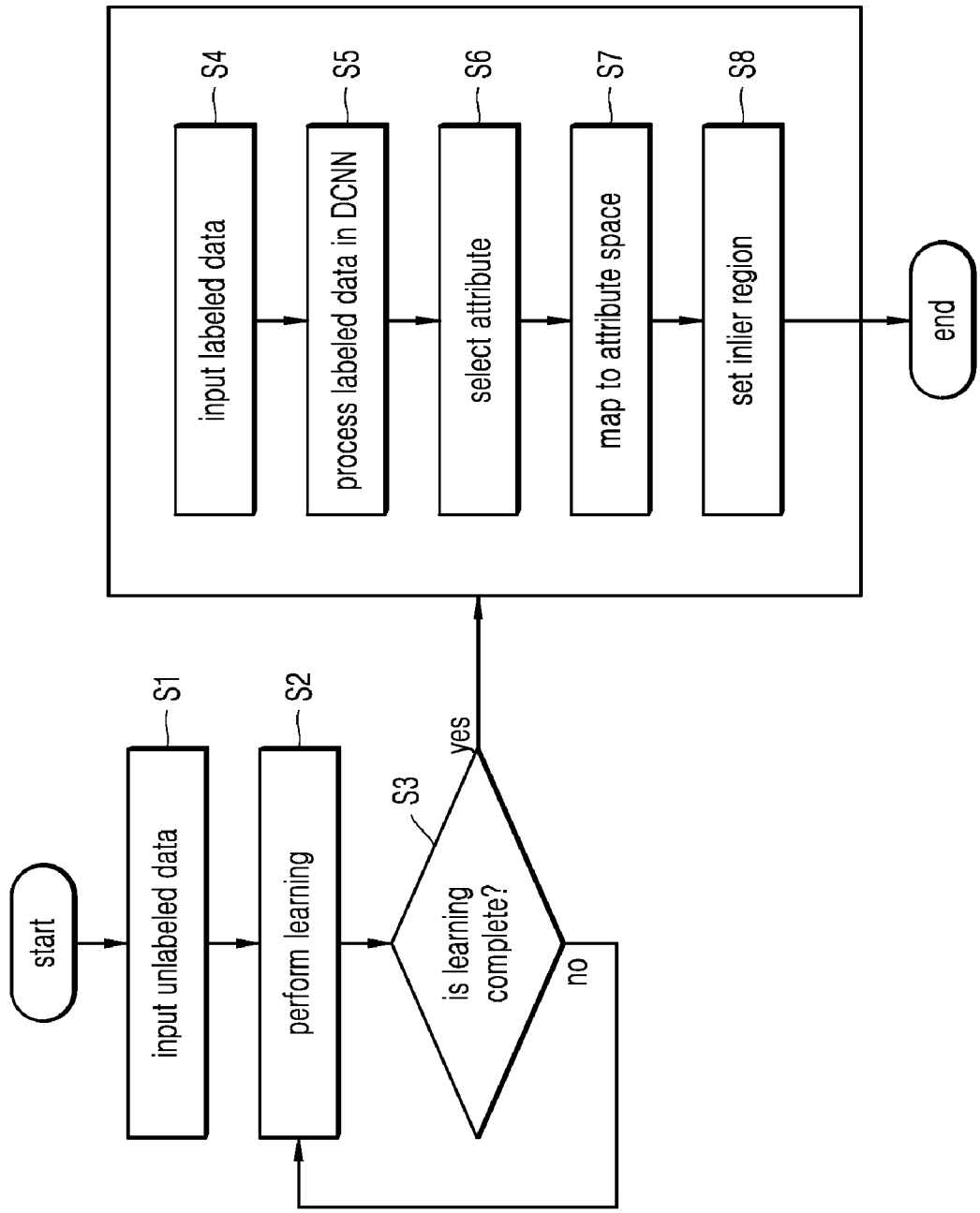
FIG. 2 shows a process of a classification device performing learning according to an embodiment of the present invention.

FIG. 2 shows a process of the classification device performing learning according to an embodiment of the present invention.

The learning unit 110 of the classification device 100 receives a large amount of labeled data (S1). The unlabeled data may be supplied in various ways. The unlabeled data may be collected via web or provided to a database.

The learning unit 110 performs learning using the received data (S2). As an embodiment, the learning unit 110 performs attribute counting learning, which is for collecting K attributes necessary to identify an object using deep convolutional neural networks (DCNNs).

The learning unit 110 repeats the learning. Whether the learning is complete may be determined using various criteria (S3). The learning unit 110 may determine that the learning is complete when the number of attributes or types of attributes to be extracted is greater than or equal to a certain number. Various criteria for determining whether the learning is complete may be proposed depending on the configuration of the learning unit 110.

When the learning is complete after being sufficiently performed, the learning unit 110 receives labeled data again (S4). The learning unit 110 processes the labeled data (S5). When the learning unit 110 includes a DCNN, the learning unit 110 inputs the labeled data to the DCNN, and the DCNN processes the labeled data using the labeled data.

The labeled data is also classified according to the attributes collected by the learning unit 110. A class for classifying the labeled data may be referred to as a label. Since meta-information "label" is included in the labeled data, the learning unit 110 may classify the K attributes into attributes that affect label setting and attributes that do not affect label setting.

That is, the learning unit 110 selects attributes necessary to identify and classify objects (S6). Also, the learning unit 110 maps previous unlabeled data to the attribute space using the selected attributes.

That is, the unlabeled data is classified according to the selected N attributes. The learning unit 110 maps unlabeled data to an N-dimensional space composed of the selected attributes (N dimensions, N is greater than or equal to one).

Then, the unlabeled data is positioned according to the attributes, and there are constantly clustered pieces of unlabeled data. The control unit 150 sets the unlabeled data as an inlier region. Two or more inlier regions may be formed according to a clustering degree and a cluster size.

The control unit 150 may define the inlier region using labels of label data. As described above, the learning and the setting of the inlier region may be performed by a single module. In this case, the corresponding module is referred to as a learning unit during the learning and is referred to as a control unit during the setting of the inlier region and outlier region.

As an embodiment, operations S4 to S6 include selecting N (smaller than K) attributes suitable for classification from an attribute counting vector consisting of K attributes calculated using the DCNN learned in operations S1 to S3 by using the labeled data prestored in the learning unit 110. As in S7, the learning unit 110 performs mapping to the attribute space using the selected attributes.

The learning unit 110 designates an inlier region and an outlier region using a region finally obtained through the mapping.

Through the process shown in FIG. 2, the learning unit 110 uses the labeled data to extract multiple attributes for a large amount of unlabeled data and select significant attributes suitable for classification from among the extracted attributes.

However, the labeled data is smaller in number than the unlabeled data, and thus not all cases can be covered. Accordingly, when data not included in an inlier region partitioned by the labeled data is forcibly included in the inlier region partitioned by the labeled data, an error occurs.

Accordingly, the classification device 100 of the present invention may define a region other than the inlier region, that is, an outlier region and may separately classify data mapped to the outlier region.

In summary, after the communication unit 180 of the classification device 100 receives the unlabeled data, the learning unit 110 inputs the unlabeled data to a learning network in the learning unit 110 to generate K attributes (S1, S2, and S3). It will be appreciated that the unlabeled data may be previously provided to the classification device 100 by means of a storage medium or the like.

Also, after the learning unit 110 inputs the labeled data to the learning network, the learning unit 110 selects N attributes from among the K attributes using a result output in response to the inputting of the label data by the learning network (S4 to S6).

Subsequently, the control unit 150 maps existing unlabeled data to the attribute space to set an inlier region (S7 and S8). The inlier region includes regions capable of classification to P classes in the attribute space. As an embodiment, the control unit 150 may set P inlier regions. In this case, the control unit 150 may set the inlier regions such that each of the inlier regions corresponds to one class.

Also, the control unit 150 may set more than P inlier regions. In this case, the control unit 150 may set the inlier region such that one or more inlier regions correspond to one class.

Figure 3:
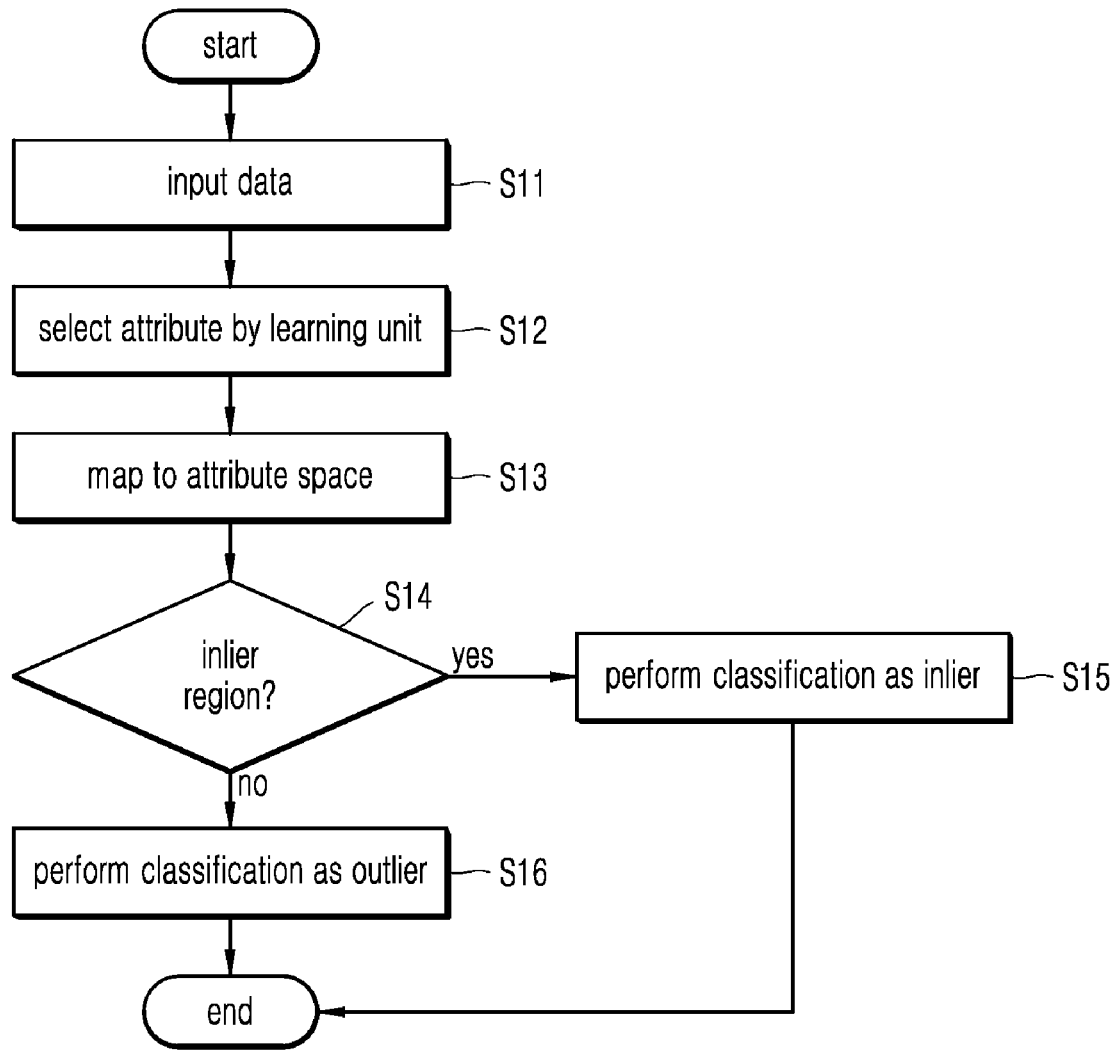
FIG. 3 shows a process of identifying whether input data is included in an outlier region according to an embodiment of the present invention.

FIG. 3 shows a process of identifying whether input data is included in an outlier region according to an embodiment of the present invention.

Data is input to the classification device 100 (S11). The learning unit 110 inputs the data to the learning network shown in FIG. 2 and selects attributes for an input image.

The learning unit 110 maps the selected attributes to the attribute space calculated as shown in FIG. 2 (S13). When a result of mapping to the attribute space indicates an inlier region (S14), the learning unit 110 classifies the input data as an inlier (S15). When there are multiple inlier regions, the input data may be classified as an inlier of one of the inlier regions. The learning unit 110 classifies the input data as a class corresponding to the inlier.

On the other hand, when a result of mapping to the attribute space does not indicate an inlier region, the learning unit 110 classifies the input data as an outlier (S16). When multiple pieces of data are clustered and classified in an outlier region, the learning unit 110 may set an automatically generated label for corresponding cluster data and form the cluster data as a new inlier region.

Referring to FIG. 3, the control unit 150 inputs new data to the learning unit 110 (S11). When the learning unit 110 calculates a result indicating that the input data is not mapped to the inlier region (S15), the control unit 150 sets the new data as outlier data of the outlier region (S16).

Referring to FIGS. 2 and 3, the learning unit 110 may recognize even an unlearned object as a new object after the learning is performed using a large amount of unlabeled data. The learning unit 110 may be used as a preprocessor for incremental learning.

That is, the incremental learning may be performed by primarily forming an inlier region using unlabeled data and labeled data and inputting new unlabeled data to form another inlier region in an outlier region.

Figure 4:
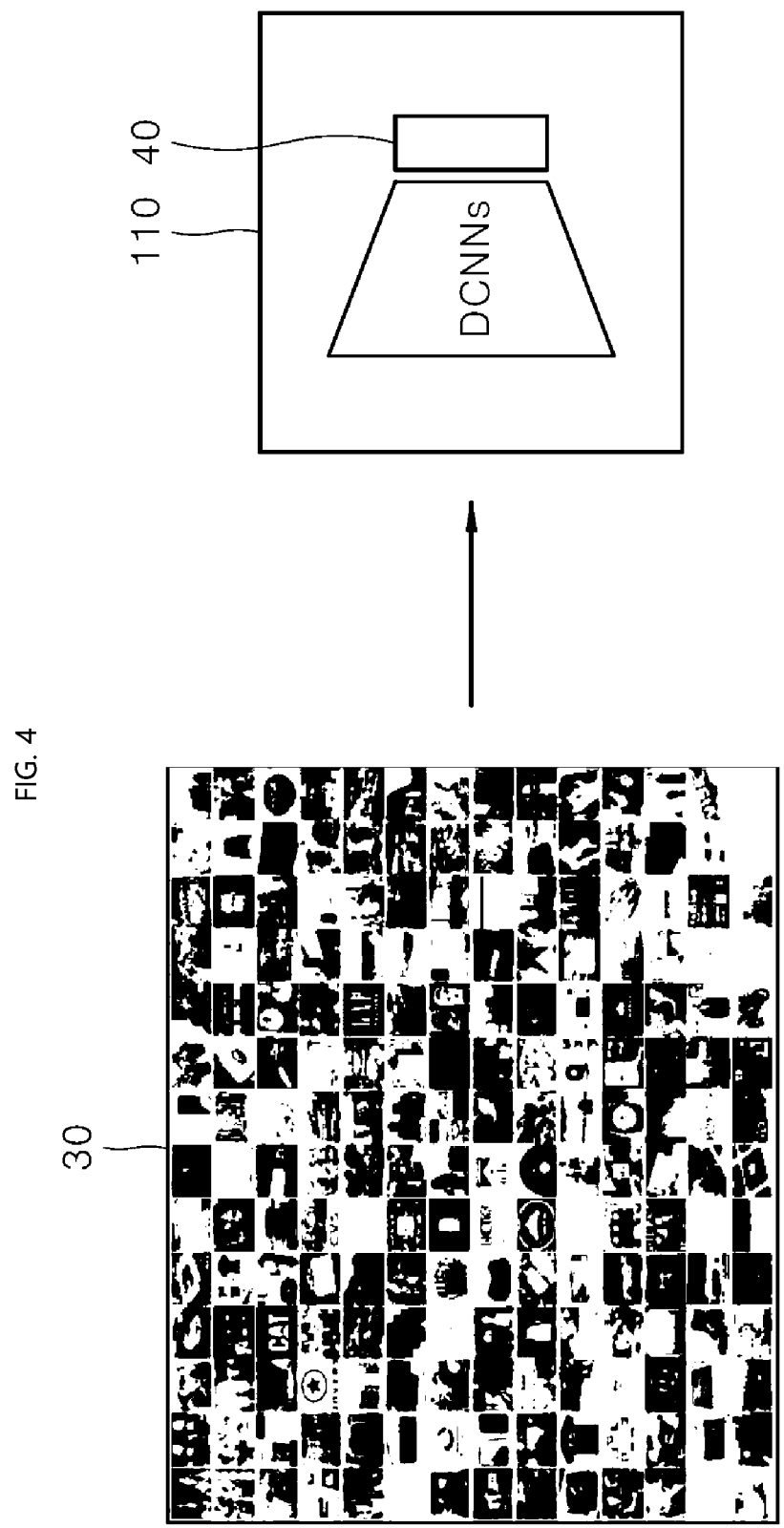
FIG. 4 shows a process of inputting unlabeled data to perform learning according to an embodiment of the present invention.

FIG. 4 shows a process of inputting unlabeled data to perform learning according to an embodiment of the present invention. The reference numeral 30 indicates multiple pieces of image data, which is unlabeled data. The image data is input to the learning unit 110. The learning network (DCNN) of the learning unit extracts attributes from the input image data.

An attribute includes whether a specific form is included in an image, the number of specific forms, and the like. For example, the learning unit 110 may define whether a circle is included, whether a quadrangle is included, a color range, and the like as attributes.

As a result, the learning unit 110 calculates an attribute counting vector consisting of multiple attributes in the unlabeled data. A very large number of attributes may be calculated. However, these attributes are not all significant in identifying objects. To this end, a process of inputting the labeled data is necessary.

Figure 5:
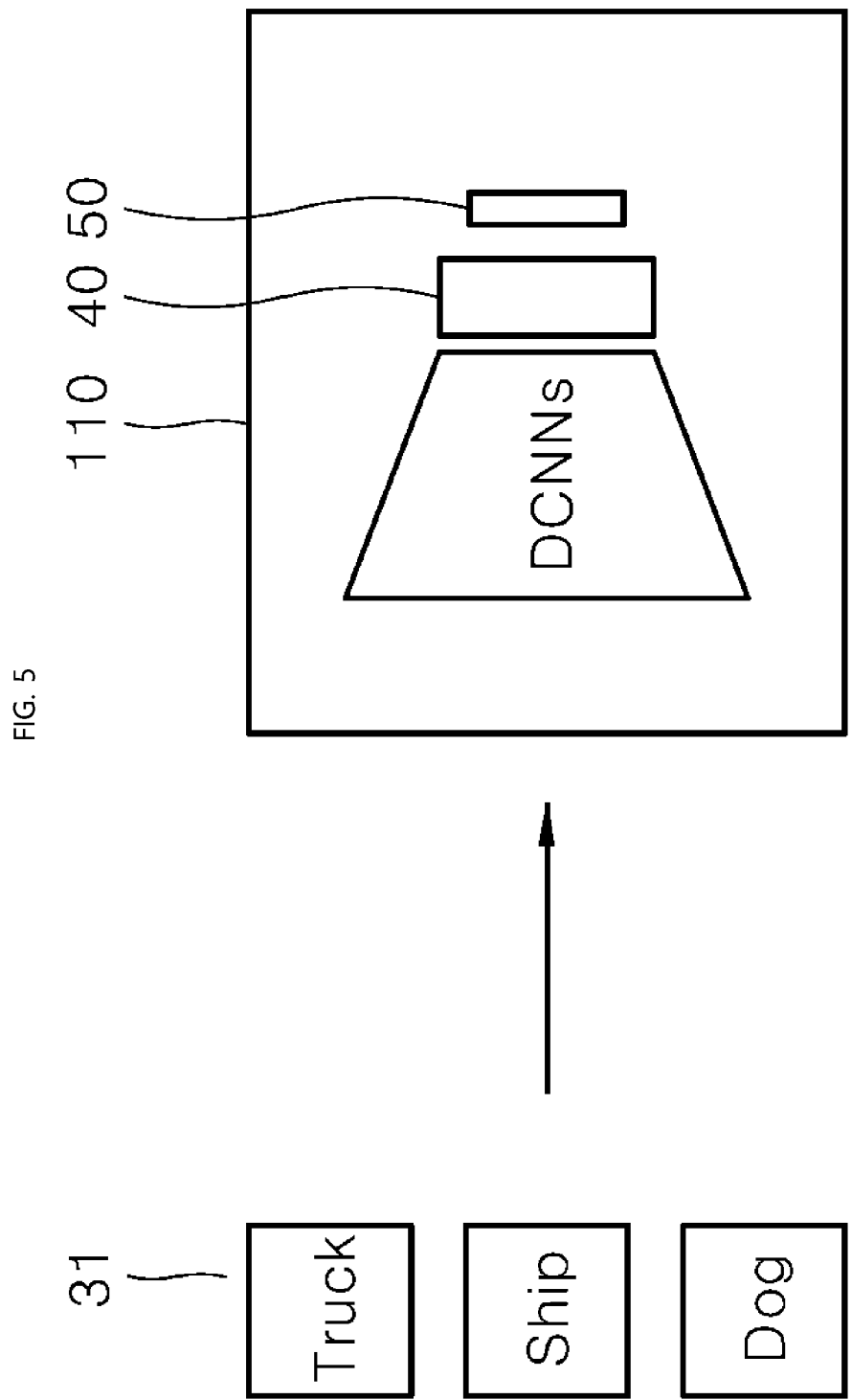
FIG. 5 shows a process of inputting labeled data to select attributes according to an embodiment of the present invention.

FIG. 5 shows a process of inputting labeled data to select attributes according to an embodiment of the present invention.

Labeled data 31 refers to each image data with its name added thereto.

When the labeled data is received, the DCNN of the learning unit 110 applies an attribute counting vector 40 including the attributes shown in FIG. 4 to an input image, performs label comparison, and selects significant attributes.

This process is repeated. As a result, significant attributes 50 are selected in response to the input labeled data 31. The reference numeral 50 indicates attributes selected as significantly affecting labeling and also attributes selected from the attribute counting vector 40.

Also, when the above-described labeled data is used, the classification device 100 may generate an inlier region in an attribute space formed of the selected attributes.

Figure 6:
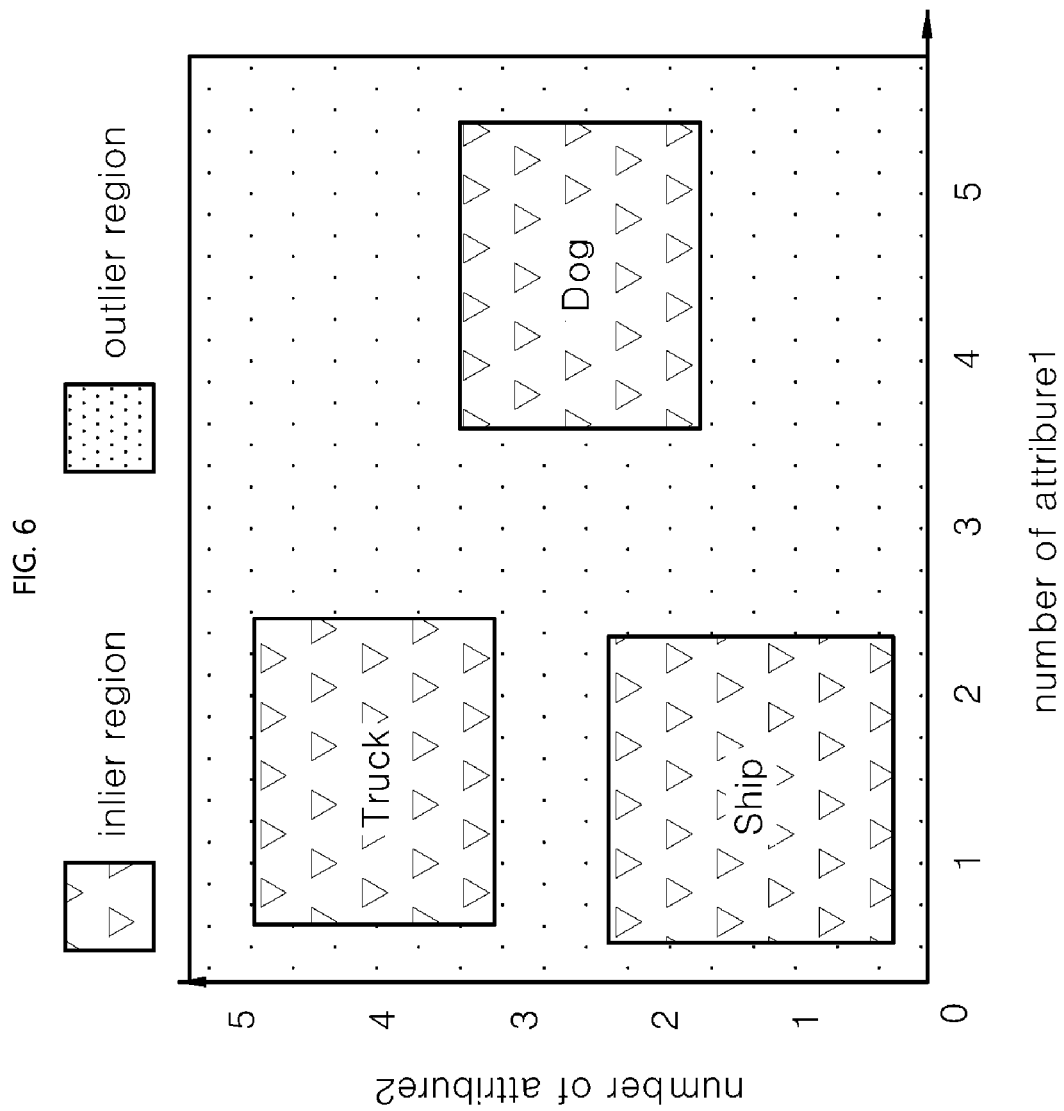
FIG. 6 shows inlier regions designated in an attribute space according to an embodiment of the present invention.

FIG. 6 shows inlier regions designated in an attribute space according to an embodiment of the present invention. FIG. 6 shows three inlier regions "TRUCK," "SHIP," and "DOG." The other regions indicate outlier regions.

In summary, as shown in FIG. 4, the classification device 100 performs learning to extract attributes using unlabeled data. During this process, the learning unit 110 calculates multiple attributes. Also, as shown in FIG. 5, the attributes 50 are selected using existing labeled data. The control unit 150 of the classification device 100 maps the attributes selected as shown in FIG. 6 onto the attribute space to designate an inlier region and an outlier region.

When an unlearned object is received as an input while object recognition is performed, the classification device of FIG. 1 may calculate one of the following results. When new input data corresponds to one learned class (this class being formed as an inlier region), the classification device 100 classifies the input data as the corresponding class. The input data is classified as a specific class of an inlier or inlier data.

On the other hand, when the input data is not included in a specific inlier region, the classification device 100 does not classify the input data as one learned class.

Instead, the classification device 100 recognizes the input data as a new object corresponding to the outlier region and increases object recognition accuracy. That is, when an object not mapped to a class/inlier region established through previous learning is input, the classification device 100 does not forcibly map this object to the existing inlier region. As a result, the classification device 100 prevents the occurrence of an error by forcibly mapping data to the existing inlier region.

Figure 7:
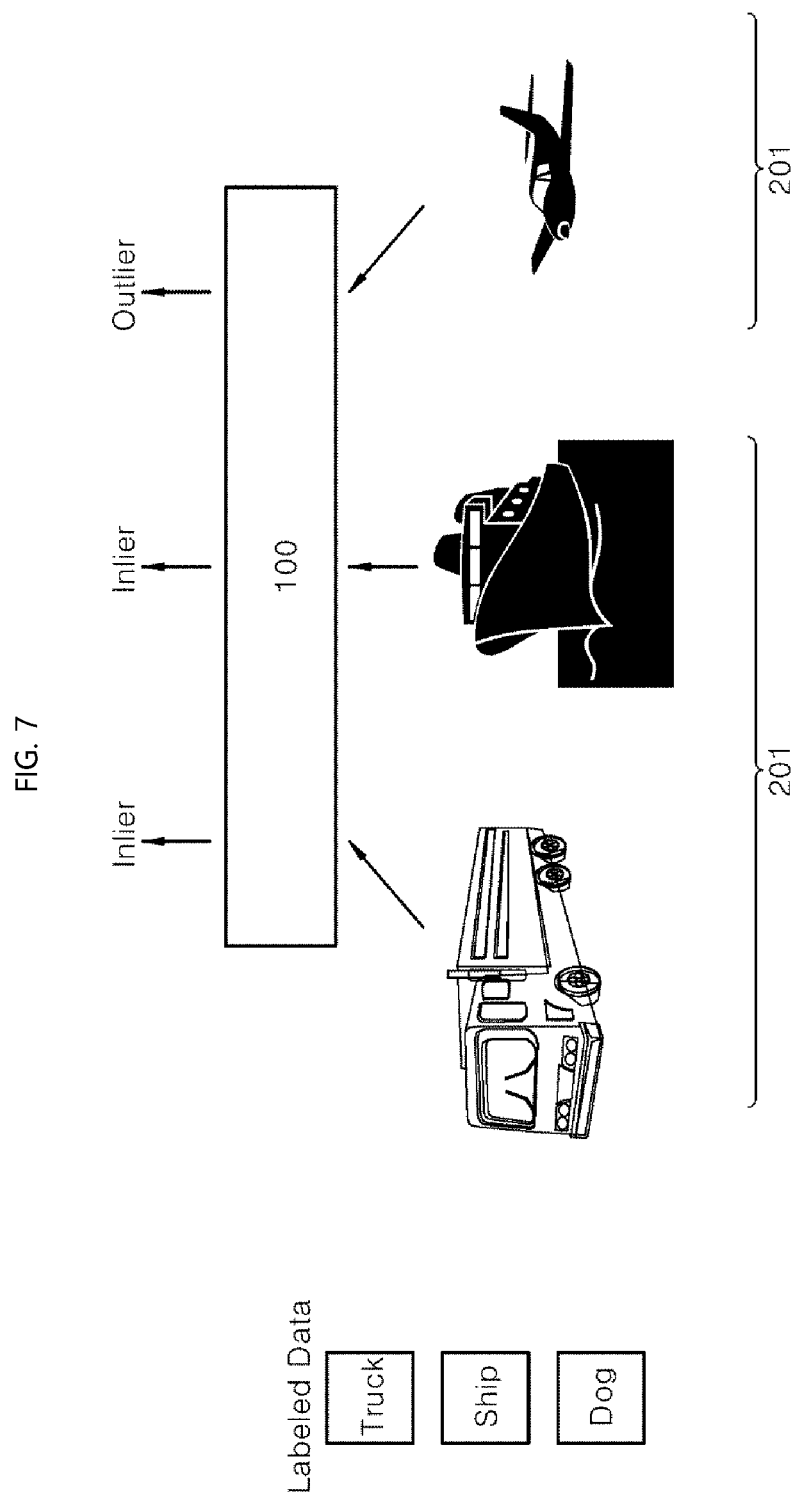
FIG. 7 shows an example of identifying an outlier region according to an embodiment of the present invention.

FIG. 7 shows an example of identifying an outlier region according to an embodiment of the present invention. Referring to FIG. 5, "Truck," "Ship," and "Dog" are input as labeled data. Also, the attribute counting vector 50 is calculated based on the input as shown in FIG. 5.

A classification device 100 of FIG. 7 includes the learning unit 110 that performs learning during the above-described processes shown in FIGS. 4 to 6. Accordingly, as shown in FIG. 7, when images 201, which are unlabeled data included in a category (truck or ship) given to the labeled data, are input, the classification device 100 allocates a piece of input data to an inlier region corresponding to each class. For example, the learning unit 110 classifies the input data as a class "Truck" or "Ship."

On the other hand, when an image 202 not corresponding to the inlier region or class calculated through the previous learning process is input, the classification device 100 allocates the input data to an outlier region.

Thus, the learning unit 110 and the control unit 150 of the classification device 100 may classify an inlier region and an outlier region using N attributes selected from the attribute counting vector. The classification device 100 does not forcibly classify the unlabeled data difficult to define with attributes into an existing inlier region.

For example, when "Truck," "Ship," and "Dog" are input as the labeled data, the learning unit 110 may select a tire and a window as attributes to be applied during classification. In more detail, the learning unit 110 selects attributes such as "tire-three" and "window-two."

Figure 8:
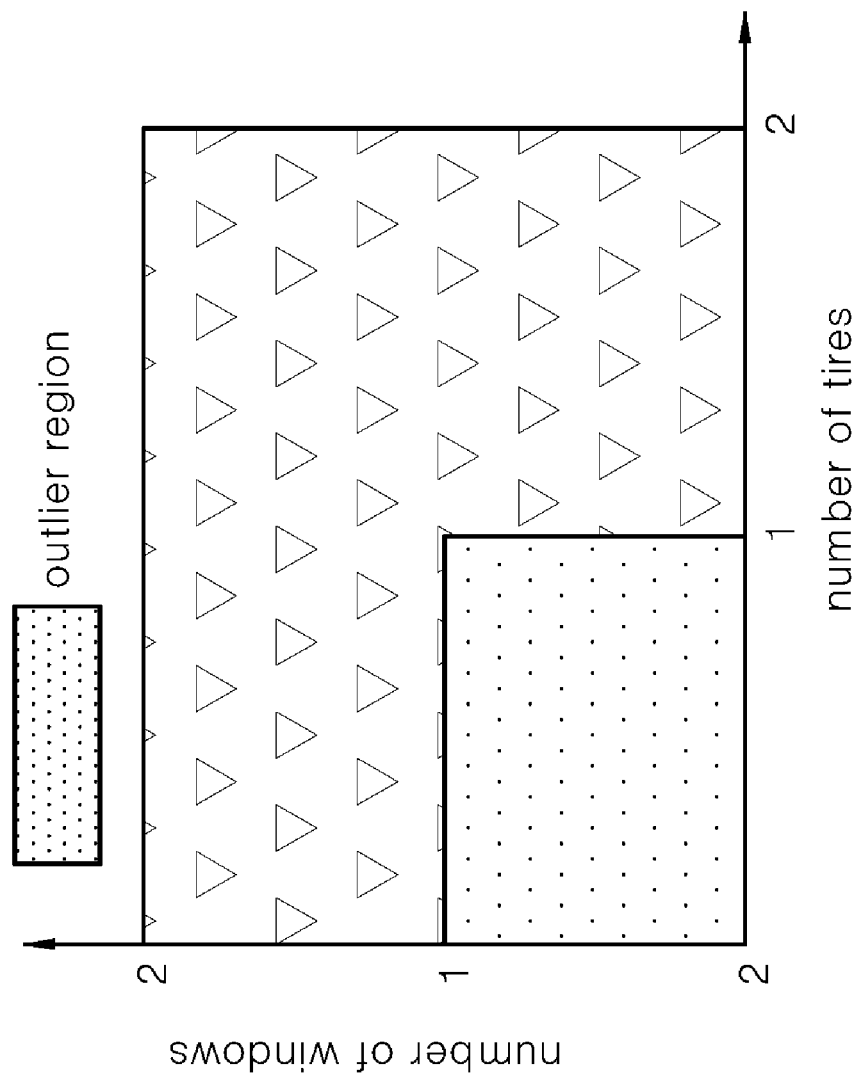
FIG. 8 shows an attribute space when a truck is formed using inliers according to an embodiment of the present invention.

FIG. 8 shows an attribute space when a truck is formed using inliers according to an embodiment of the present invention. In the attribute space, the Y axis indicates the number of windows, and the X axis indicates the number of tires. Thus, an outlier region and an inlier region are determined.

The attribute space may be multi-dimensionally formed. In this case, the control unit 150 sets inlier regions corresponding to value ranges of the attributes. Also, each of the inlier regions is classified as one class.

Figure 9:
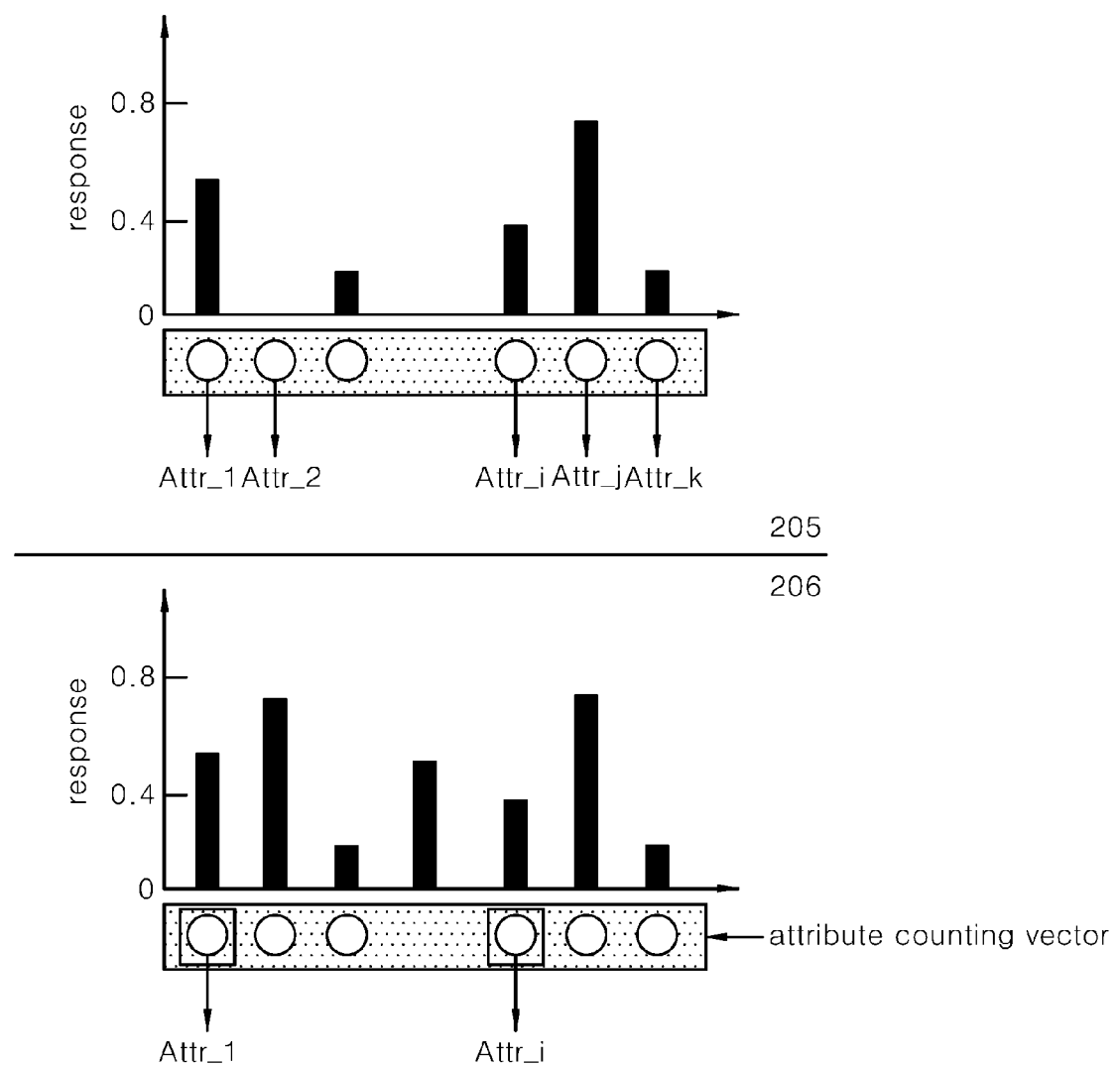
FIG. 9 shows a process of selecting mapping to an attribute space from among attributes according to an embodiment of the present invention.

FIG. 9 shows a process of selecting mapping to an attribute space from among attributes according to an embodiment of the present invention.

The learning unit 110 calculates attributes that affect the classification during the learning process as indicated by the reference numeral 205. The attributes Attr_1, Attr_2, ..., Attr_i, Attrj, and Attr_k are arranged along an X axis, and "responses" in which the attributes affect the classification of image data are arranged along a Y axis. The attributes may include the number of windows in an image, the number of tires, a background color, the number of lines in an image, or the like. A result for each attribute indicated by the reference numeral 205 is calculated during the learning process is indicated by the reference numeral 206.

As an embodiment, the attributes constituting the attribute counting vectors are arranged along the X axis. In the reference numeral 206, the learning unit 110 selects attributes suitable for classification. Here, the attributes are selected from the attribute counting vector consisting of multiple attributes. The learning unit 110 may select the attributes using attributes constituting an inlier region and statistical characteristics when these attributes are mapped to a specific class.

For example, the learning unit 110 may select attributes capable of minimizing a value obtained by dividing an intra-class variance by an inter-class variance. See Equation 1 below.

$$F1=(\text{intra-class variance/inter-class variance,Attr\_1});$$

$$F2=(\text{intra-class variance/inter-class variance,Attr\_2});$$

$$\ldots$$

$$Fj=(\text{intra-class variance/inter-class variance,Attr\_j});$$

$$Fk=(\text{intra-class variance/inter-class variance,Attr\_k}); \quad \text{[Equation 1]}$$

F1 indicates a result of dividing an intra-class variance by an inter-class variance when an attribute Attr_1 is used. F2 indicates a result of dividing an intra-class variance by an inter-class variance when an attribute Attr_2 is used. Fj indicates a result of dividing an intra-class variance by an inter-class variance when an attribute Attr_j is used.

The learning unit 110 calculates F1 to Fk and checks whether the smallest value is F1 and Fi. Also, the learning unit 110 selects Attr_1 and Attr_i and generates an attribute space.

The intra-class variance denotes the degree of data density within one class. The inter-class variance denotes the degree of density between classes and represents the degree of separation between classes. Accordingly, only when the intra-class variance has a smaller value, that is, a denser value, accuracy in class classification increases as the degree of density within the class increases. Likewise, only when the inter-class variance has a larger value, that is, a value that is less dense and that has a greater distance between classes, it is possible to reduce a classification error between classes.

It will be appreciated that the learning unit 110 may select attributes according to various criteria other than Equation 1. In this case, for the attribute selection criteria, when the labeled data is clustered based on attributes, the learning unit 110 may consider the following conditions. The attributes selected by the learning unit 110 increases the degree of density for the cluster of the labeled data within one classification unit (class).

Also, the learning unit 110 separates the distance in the cluster of the labeled data between classification units. As a result, the labeled data may be clustered in an N-dimensional attribute space (N is greater than one) consisting of the selected attributes.

The process of the learning unit of FIG. 9 selecting attributes is summarized as follows.

A label allocated to the labeled data may be set using one of P labels. Accordingly, the labeled data is divided into P classes. The learning unit 110 calculates the degree of density and the degree of separation for each of the P classes classified through the K attributes of the attribute counting vector.

That is, the learning unit 110 calculates the degree of density (intra-class density) between pieces of data in each of the P classes classified by a first attribute (i.e., data in each of the P classes classified by a first attribute). As an embodiment, the degree of density is the above-described intra-class variance.

Also, the learning unit calculates the degree of external separation (inter-class distance) between the P classes classified by the first attribute. As an embodiment, the degree of separation is the above-described inter-class variance.

The learning unit 110 calculates the above-described degree of density and degree of separation for the K attributes and selects N attributes using the calculation result. The learning unit 110 may apply the descending order of density or the descending order of separation to select the N attributes.

Figure 10:
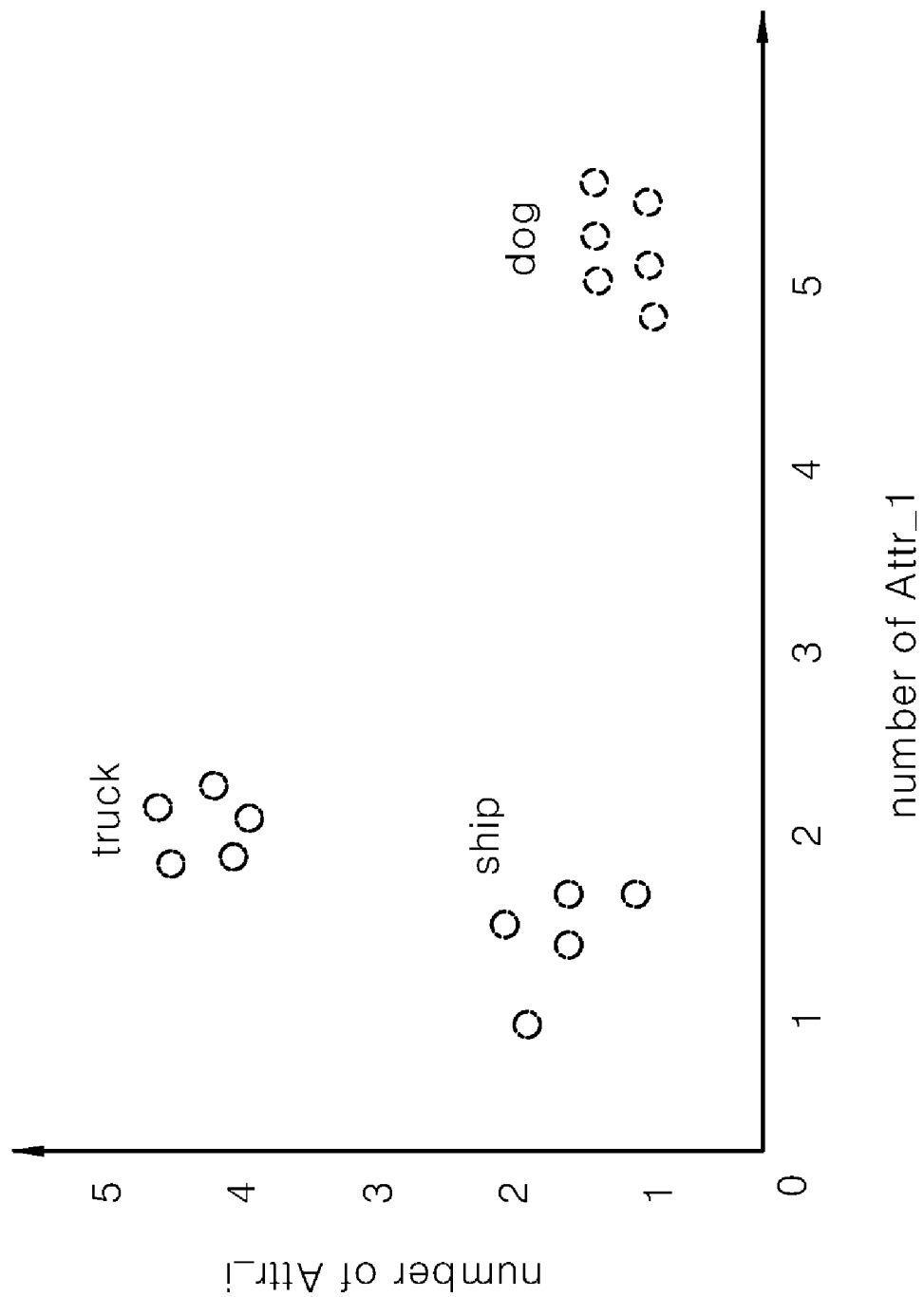
FIG. 10 shows forming an inlier region by multiple pieces of labeled data being clustered in an attribute space consisting of selected attributes according to an embodiment of the present invention.

FIG. 10 shows forming an inlier region by multiple pieces of labeled data being clustered in an attribute space consisting of selected attributes according to an embodiment of the present invention. As described with reference to FIG. 9, the control unit 150 may generate N-dimensional attribute data using the N (two in FIG. 10) attributes (Attr_1 and Attr_i) selected by the learning unit 110. "Truck," "Dog," and "Ship" form respective clusters, and the clusters are separated from one another.

That is, the learning unit 110 may compare a distance between pieces of the labeled data inside each cluster (intra-class-distance) and a distance between pieces of the labeled data outside each cluster (inter-class-distance) and may select attributes allowing the clustering to be performed such that intra-class-distance is smaller than inter-class-distance.

Figure 11:
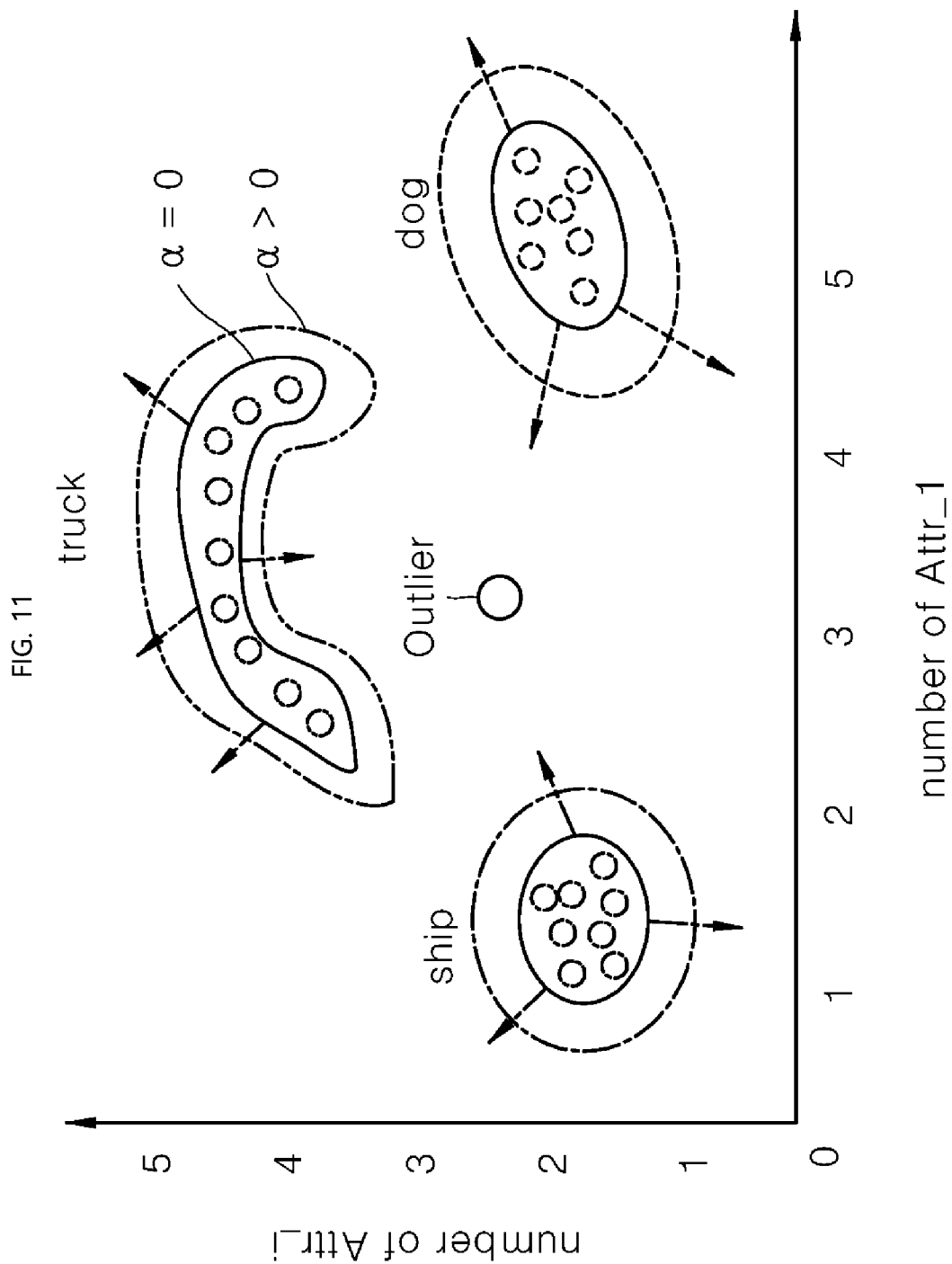
FIG. 11 shows settings of an inlier region of unlabeled data according to an embodiment of the present invention.

FIG. 11 shows settings of an inlier region of unlabeled data according to an embodiment of the present invention. The control unit 150 classifies a large amount of unlabeled data previously used for the learning on the basis of the previously selected attributes and positions the unlabeled data in the attribute space. As a result, the control unit 150 sets an inlier region. It will be appreciated that the labeled data may be included in the inlier region.

That is, the control unit 150 generates an attribute space consisting of N attributes to generate an attribute space consisting of significant attributes in classifying P classes indicated by the labeled data. The control unit 150 positions the unlabeled data in the attribute space to generate P inlier regions corresponding to the P classes.

For example, the control unit 150 positions multiple pieces of unlabeled data in the attribute space using two attributes Attr_i and Attr_1 selected based on three classes Truck, Ship, and Dog given as the labeled data. Also, the control unit 150 sets an inlier region in the attribute space on a class basis. In FIG. 11, the control unit 150 generates three inlier regions corresponding to the three classes.

The control unit 150 may set the inlier regions in two ways. The control unit 150 may set a minimal boundary by using only unlabeled data in a corresponding cluster. For example, the control unit 150 may set a boundary having a minimal region including all the data (feature data) of the class forming each inlier region. The boundary is indicated by a solid line in FIG. 11.

Also, the control unit 150 may reset the range of the boundary by applying a specific parameter (e.g., a). The control unit 150 may set the minimal boundary such that the boundary range covers all the data within the class by setting a to zero. The control unit 150 may define the minimal boundary as an inlier region.

Also, the control unit 150 may set an extended boundary such that the boundary range covers all the data within the class by setting a to greater than zero. The control unit 150 may define the extended boundary as an inlier region. Parts indicated by a dotted line in FIG. 11 represent a configuration of partially extending the boundary. When the boundary is extended, the control unit 150 may adjust a such that the boundary between classes maintains a certain distance.

In FIG. 11, a boundary line of each inlier region may be formed as any one or more of a convex boundary line and a non-convex boundary line.

It is assumed that the inlier regions are set as shown in FIG. 11. When new image data is input, this data may be mapped to a point that is not included in any one of the inlier regions of FIG. 11. In this case, the control unit 150 of the classification device 100 sets the input data as an outlier.

FIG. 12 shows a process of a control unit setting an inlier region by positioning labeled data and unlabeled data in a selected attribute space according to another embodiment of the present invention.

Through FIGS. 10 and 11, it has been seen that the labeled data and the unlabeled data are positioned in different regions of the attribute space. This is because the number of unlabeled data is greater than the number of labeled data.

However, when the classification device 100 sets the inlier regions on the basis of the unlabeled data, accuracy may be lowered in that the labeled data is data that is accurately labeled data and the unlabeled data is mapped to a class of a corresponding label within a certain range.

Thus, the control unit 150 sets a region where the labeled data is positioned as a core inlier region 210 and sets a region where the unlabeled data is positioned as a temporary inlier region 220.

Also, the control unit 150 compares the temporary inlier region 220 and the core inlier region 210 and reset a boundary portion of the temporary inlier region 220 having a large gap. For example, in FIG. 12, a region 220*a* is very separated from the core inlier region 210.

That is, the distance between the unlabeled data positioned in the region 220*a* and labeled data positioned in the core inlier region 210 is great. The distance between the boundary of the temporary inlier region 220 in the region 220*a* and the boundary of the core inlier region 210 is indicated by a double arrow. Accordingly, the unlabeled data positioned in the region 220*a* lowers the degree of density of the inlier region.

Thus, finally, the control unit 150 redefines the inlier regions as indicated by the reference numeral 230 by reducing the area of the region 220*a*.

This can be summarized as follows. The control unit 150 positions the unlabeled data for each class in the attribute space to generate the temporary inlier region 210 having a generated boundary line. Also, the control unit 150 generates the core inlier region 210 where the labeled data included in each class is positioned.

Also, the control unit 150 calculates the distance between the boundary lines of the core inlier region and the temporary inlier region on a class basis. Also, the control unit 150 adjusts the boundary line of the temporary inlier region by excluding the unlabeled data having the distance greater than or equal to a reference value and then finally calculates the inlier regions.

The inlier region adjusted as indicated by the reference numeral 230 of FIG. 12 may increase accuracy.

Meanwhile, when a distance between new outliers has a high degree of density to form one class, the control unit sets the outliers as a new inlier region. This will be described with reference to FIG. 13.

FIG. 13 shows a process of defining an outlier region as a new inlier region according to an embodiment of the present invention.

The control unit 150 calculates a distance between multiple pieces of outlier data positioned in the outlier region and defines the multiple pieces of outlier data as one class.

Data of the outlier region indicated by the reference numeral 241 is clustered. Data of the outlier region indicated by the reference numeral 242 is not clustered but isolated.

The control unit 150 determines that the data indicated by the reference numeral 241 corresponds to the outlier region but can form a new class. The control unit 150 calculates the degree of density on the basis of the distances between the pieces of data indicated by the reference numeral 241 in the attribute space, calculates the degree of separation on the basis of the distance between the other classes (truck/ship/dog), and determines whether it is necessary to generate a new class.

When the determination result is that the degree of density and the degree of separation satisfy predetermined criteria, the control unit 150 generates a boundary including data of a corresponding outlier region. Also, the control unit 150 sets the boundary region as a new inlier region 250 and automatically assigns a class name (e.g., inlier-new1) to the new inlier region 250.

Subsequently, when new input data is included in the inlier region indicated by the reference numeral 250, the control unit 150 defines the new data not as outlier data but as data of the inlier region of the class inlier-new1.

Figure 14:
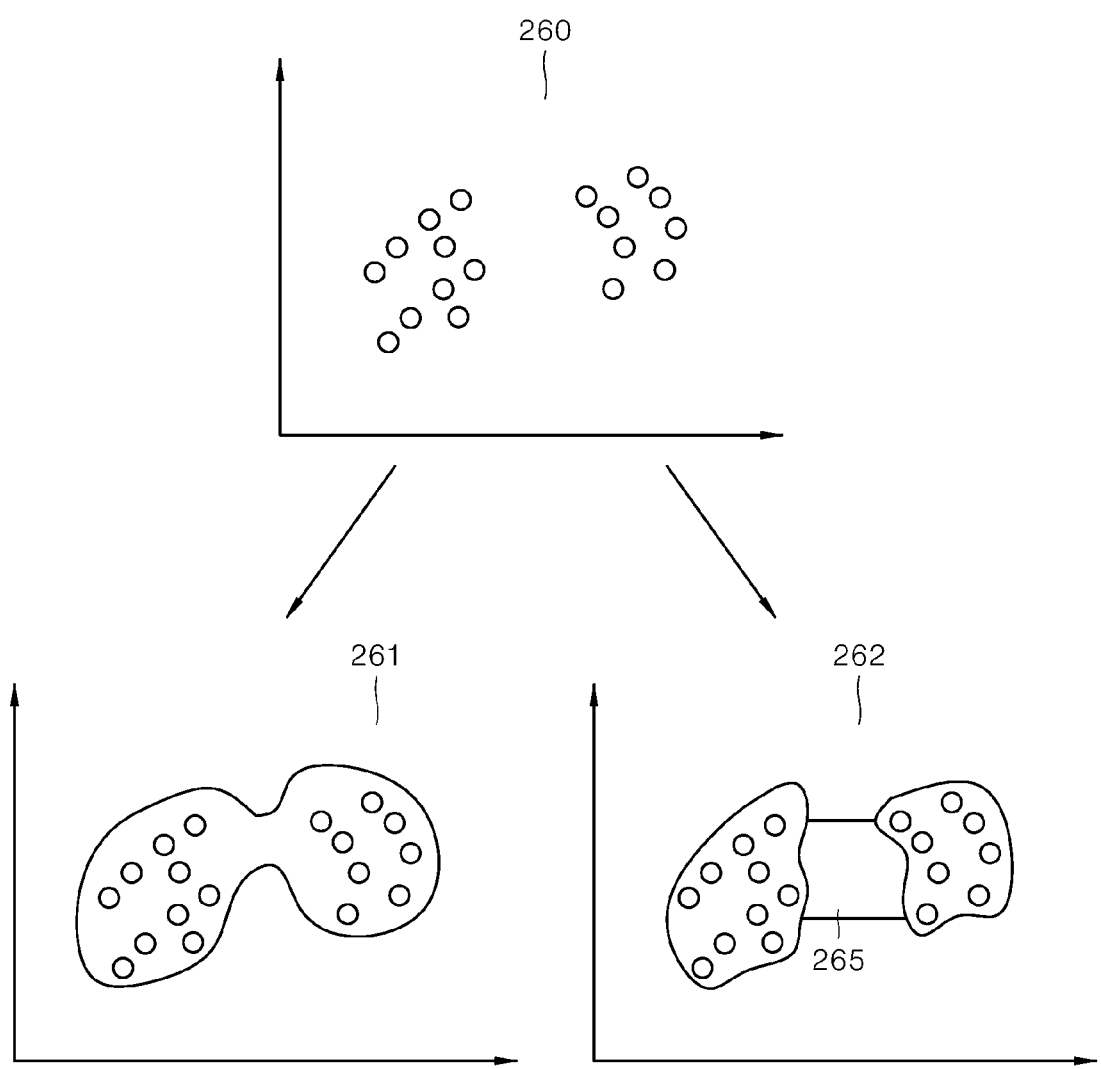
FIG. 14 shows a process of defining two or more inlier regions in one class 20 according to an embodiment of the present invention.

FIG. 14 shows a process of defining two or more inlier regions in one class according to an embodiment of the present invention.

The reference numeral 260 indicates a graph in which unlabeled data defined as one class is positioned in a two-dimensional attribute space. The control unit 150 may set one inlier region as indicated by the reference numeral 261 while the unlabeled data is distributed as indicated by the reference numeral 260. Alternatively, the control unit 150 may set two inlier regions as indicated by the reference numeral 261.

Also, when the control unit 150 sets two inlier regions as indicated by the reference numeral 262, a space between the two inlier regions may be defined as an outlier region 265. New labeled data may be input during the upgrade of the learning unit 110, may correspond to the above-described class, and may be mapped to the space between two inlier regions indicated by the reference numeral 262 (a portion indicated by the reference numeral 265). In this case, the control unit 150 may integrate two inlier regions by including the new input labeled data.

The above-described classification device may be included in various devices. For example, the above-described classification device may be disposed in an autonomous robot or vehicle. Also, as an example, the classification device may be included in a cellular phone or smartphone. The classification device 100 may variously classify images captured by devices such as a smartphone, a cellular phone, and a camera.

Also, the classification device may be included in a server apparatus that stores images. For example, a server apparatus that receives an image from various external devices and stores the received image may perform preprocessing on the received image and classify the image into a specific class.

The above-described classification includes inputting the classified image to the pre-learned classification device 100 and mapping the input image to one of the inlier regions in the classification device 100. Also, the classification device separately may store an image corresponding to an outlier region during the classification process and may receive labeled data corresponding to the outlier region when the learning unit 110 is upgraded later.

In this process, the classification device 100 sets the outlier region as a new inlier region. Also, the classification device 100 may increase the accuracy of image classification on the basis of the inlier region by re-adjusting the previous range of the inlier region.

The above-described classification device 100 may set the outlier region in addition to the inlier region and may map, to the outlier region, an unclassified object among unlabeled data learned during an object recognition process and labeled data guiding the learning of the unlabeled data.

The above-described classification device 100 may primarily set a classification class on the basis of the labeled data during the object recognition process and then may map data corresponding to the outside of the class to a new outlier region, instead of classifying the corresponding data into an existing class.

The above-described classification device 100 can solve a problem of data being misclassified by forming an outlier region that does not belong to the previously set inlier region during an object recognition process.

FIG. 15 shows an example in which the classification device is implemented in a robot according to an embodiment of the present invention.

The classification device may be installed in a robot 1000. The robot 1000 recognizes an object using the classification device 100. As an embodiment, the robot 1000 includes a guide robot, a cart robot, a cleaning robot, etc. The robot 1000 may move autonomously under the control of the classification device 100.

A moving unit 190 moves a cart robot along a route generated by a robot control unit 1050. The moving unit 190 may move the robot by rotating wheels included in the moving unit 190.

An obstacle sensor 1020 senses an obstacle disposed near the cart robot. The obstacle sensor 1020 may sense a distance between the robot and a person, a wall, an object, a fixed object, or an installed object. Alternatively, the obstacle sensor 1020 may capture an image of an object/person/installed object near the robot.

When the obstacle sensor 1020 captures an image, the classification device 100 may classify the captured image.

An interface unit 1030 includes a display screen, and the robot 1000 outputs predetermined information or receives a command from a user. The interface unit 1030 may include a microphone and receive a voice command from a user.

A communication unit 1080 transmits or receives information to or from the outside.

An artificial intelligence module may be additionally installed in the robot control unit 1050 of FIG. 15. When the obstacle sensor 1020 provides a sensed value to the control unit 1050, the artificial intelligence module in the control unit 1050 receives the sensed value and checks a situation near the robot. As an embodiment, the artificial intelligence module includes a machine learning or a deep learning network.

The robot control unit 1050 may perform context awareness using the artificial intelligence module. Likewise, the control unit 1050 may recognize the situation of the robot 1000 by using sensed values, user control, or information received from a server or other cart robots as an input value of the artificial intelligence module.

Also, the robot control unit 1050 may read image information input using the artificial intelligence module. That is, the control unit 1050 may perform image processing. The classification device 100 may process the image input through the process, and the classification device 100 may classify which object is included in an image.

The above-described artificial intelligence module may include an inference engine, a neural network, and a probability model. Also, the artificial intelligence module may perform supervised learning or unsupervised learning based on a variety of data.

Also, the artificial intelligence module may perform natural language processing in order to recognize a user's voice and extract information from the voice.

Even though all the components of the above-described embodiments of the present invention have been described as being combined into a single component or as operating in combination, the present prevention is not necessarily limited to these embodiments. All the components may operate by being selectively combined into one or more components within the object range of the present invention. Also, each element may be implemented with one independent hardware device, but some or all of the elements may be selectively combined and implemented as a computer program having a program module for performing some or all functions combined in one or more hardware devices. Codes and code segments constituting the computer program can be easily construed by those skilled in the art. The embodiments of the present invention may be implemented by the computer program being stored in a computer-readable storage medium and being read and executed by a computer. The storage medium for the computer program includes storage media including a magnetic recording medium, an optical recording medium, and a semiconductor recording device. Also, the computer program for implementing the embodiments of the present invention includes a program module that is transmitted through an external apparatus in real time.

While the present invention has been described with reference to exemplary embodiments, the present invention may be variously changed or modified by those skilled in the art. Therefore, it is to be understood that such changes and modifications are included within the scope of the present invention without departing from the scope of the present invention.

The invention claimed is:

1. A method for outlier classifying during object recognition learning, the method comprising:
receiving unlabeled data and calculating K attributes of the unlabeled data;
receiving labeled data and selecting N attributes from among the K attributes;
setting an inlier region for each class of the labeled data in an attribute space consisting of the N attributes; and
setting an outlier region, excluding the inlier region, in the attribute space, wherein the calculating of the K attributes comprises:
receiving the unlabeled data by a communication unit of a classification device;
inputting the unlabeled data to a learning network in a learning unit
generating the K attributes by the learning unit, wherein the learning network is a deep convolutional neural network: and
further comprising:
inputting the labeled data to the learning network by the learning unit;
selecting the N attributes from among the K attributes using a result that is output by the learning network in response to the inputted labeled data, wherein the N is smaller than the K;

dividing the labeled data into P classes;
wherein the selecting comprises:
selecting the N attributes by the learning unit calculating a degree of internal density of the P classes and a degree of external separation between each of the P classes for each of the K attributes; and
applying a descending order of the degree of internal density or a descending order of the degree of external separation.

2. The method of claim 1, further comprising:
generating the attribute space consisting of the N attributes; and
generating P or more inlier regions corresponding to the P classes in the attribute space.

3. The method of claim 1, further comprising:
inputting new data to a learning unit;
calculating a result indicating that the new data is not mapped to the inlier region; and
setting the new data as outlier data of the outlier region.

4. The method of claim 1, further comprising:
calculating a distance between multiple pieces of outlier data positioned in the outlier region; and
defining the multiple pieces of outlier data as one class.

5. A non-transitory computer-readable medium of a classification device for outlier classifying during object recognition learning, the non-transitory computer-readable medium comprising:
a communication unit configured to receive data;
a learning unit configured to:
perform learning for classification using data received from the communication unit or stored data;
receive unlabeled data and calculate K attributes through the learning; and
receive labeled data and select N attributes from among the K attributes;
a control unit configured to
control the communication unit and the learning unit;
set an inlier region for each class of the labeled data in an attribute space consisting of the N attributes; and
set an outlier region, excluding the inlier region, in the attribute space, wherein the communication unit receives the unlabeled data,
the learning unit inputs the unlabeled data to a learning network in the learning unit and generates the K attributes, and
the learning network is a deep convolutional neural network; wherein the learning unit is further configured to:
input the labeled data to the learning network, and select the N attributes from among the K attributes using a result that is output by the learning network in response to the inputted labeled data, wherein the N is smaller than the K; and
wherein the labeled data is divided into P classes, wherein the learning unit is further configured to:
select the N attributes by calculating a degree of internal density of the P classes and a degree of external separation between each of the P classes for each of the K attributes; and
apply a descending order of the degree of internal density or a descending order of the degree of external separation.

6. The non-transitory computer-readable medium of claim 5, wherein the control unit is further configured to:
generate the attribute space consisting of the N attributes; and
position the unlabeled data in the attribute space to generate P or more inlier regions corresponding to the P classes.

7. The non-transitory computer-readable medium classification device of claim 5, wherein,
the control unit inputs new data to the learning unit,
the learning unit calculates a result indicating that the input data is not mapped to the inlier region, and
the control unit sets the new data as outlier data of the outlier region.

8. The non-transitory computer-readable medium of claim 5, wherein the control unit is further configured to:
calculate a distance between multiple pieces of outlier data positioned in the outlier region; and
define the multiple pieces of outlier data as one class.

9. A robot for classifying an outlier during object recognition learning, the robot comprising:
a moving unit configured to move the robot;
an obstacle sensor configured to sense an obstacle positioned near the robot;
a classification device configured to classify an outlier during object recognition learning; and
a control unit configured to control the moving unit, the obstacle sensor, and the classification unit,
a learning unit of the classification device configured to:
receive unlabeled data and calculate K attributes through learning;
receive labeled data and select N attributes from among the K attributes; and
a control unit of the classification device configured to:
set an inlier region for each class of the labeled data in an attribute space consisting of the N attributes; and
set an outlier region, excluding the inlier region, in the attribute space;
wherein the classification device receives the unlabeled data and inputs the unlabeled data to a learning network in the classification device, and generates the K attributes,
wherein the learning network is a deep convolutional neural network, and
wherein the classification device:
inputs the labeled data to the learning network;
selects N attributes from among the K attributes using a result that is output by the learning network in response to the inputted labeled data, wherein the N is smaller than the K, wherein the labeled data is divided into P classes, and wherein the classification device is further configured to:
select the N attributes by calculating a degree of internal density of the P classes and a degree of external separation between each of the P classes for each of the K attributes; and
apply a descending order of the degree of internal density or a descending order of the degree of external separation.

10. The robot of claim 9, wherein,
the control unit inputs new data to the learning unit,
the learning unit calculates a result indicating that the input data is not mapped to the inlier region, and
the control unit sets the new data as outlier data of the outlier region.

11. The robot of claim 9, wherein the control unit is further configured to:
  calculate a distance between multiple pieces of outlier data positioned in the outlier region; and
  define the multiple pieces of outlier data as one class.

* * * * *